United States Patent
Li et al.

(10) Patent No.: US 12,281,211 B2
(45) Date of Patent: Apr. 22, 2025

(54) CHITOSAN-POLYACRYLAMIDE COMPOSITE POROUS HYDROGEL, PREPARATION AND USE THEREOF, AND METAL ION-DETECTING REAGENT AND METHOD

(71) Applicant: Institute of Environmental and Operational Medicine, Academy of Military Medical Science, Academy of Military Science, Tianjin (CN)

(72) Inventors: Shuang Li, Tianjin (CN); Zhixian Gao, Tianjin (CN); Dianpeng Han, Tianjin (CN); Jialei Bai, Tianjin (CN); Yuan Peng, Tianjin (CN); Jin Wu, Tianjin (CN); Kang Qin, Tianjin (CN); Shuyue Ren, Tianjin (CN); Yu Wang, Tianjin (CN); Huanying Zhou, Tianjin (CN); Tie Han, Tianjin (CN); Xiaoxiao Lin, Tianjin (CN)

(73) Assignee: Institute of Environmental and Operational Medicine, Academy of Military Medical Science, Academy of Military Science, Tianjin (CN)

(*) Notice: Subject to any disclaimer, the term of this patent is extended or adjusted under 35 U.S.C. 154(b) by 561 days.

(21) Appl. No.: 17/592,566

(22) Filed: Feb. 4, 2022

(65) Prior Publication Data
US 2023/0147119 A1    May 11, 2023

(30) Foreign Application Priority Data
Nov. 11, 2021    (CN) .......................... 202111333589.3

(51) Int. Cl.
C08J 3/075    (2006.01)
C08J 3/00     (2006.01)
(Continued)

(52) U.S. Cl.
CPC .............. *C08J 3/075* (2013.01); *C08J 3/005* (2013.01); *C08J 3/24* (2013.01); *C08J 9/0095* (2013.01);
(Continued)

(58) Field of Classification Search
CPC ..... C08J 3/075; C08J 3/005; C08J 3/24; C08J 9/0095; C08J 2305/08; C08J 2333/26
See application file for complete search history.

(56) References Cited

U.S. PATENT DOCUMENTS

2004/0224021 A1* 11/2004 Omidian ............... C08F 251/00
                                                         521/61

OTHER PUBLICATIONS

Risbud, M.V. et al. Polyacrylamide-Chitosan Hydrogels: In Vitro Biocompatibility and Sustained Antibiotic Release Studies. Drug Delivery, 7:2, 69-75, DOI: 10.1080/107175400266623. (Year: 2000).*
(Continued)

*Primary Examiner* — Christina H. W. Rosebach
(74) *Attorney, Agent, or Firm* — Valet Patent Service Limited

(57) ABSTRACT

The present application relates to the technical field of wastewater treatment and rapid pollutant detection, in particular to a chitosan-polyacrylamide composite porous hydrogel, preparation and use thereof, and a metal ion-adsorbing and detecting reagent and method. The chitosan-polyacrylamide composite porous hydrogel of the present application is prepared by in situ polymerization of a chitosan sol, an acrylamide, a crosslinking agent and a surfactant into a mixed solution comprising liquid droplets, followed by steps of curing, washing, and freeze-drying. The present application further provides a metal ion-detecting reagent, which is obtained by adsorbing a color developing agent into the chitosan-polyacrylamide composite porous hydrogel as described above, wherein the color developing agent is a dye that changes color when encountering metal
(Continued)

ions. The chitosan-polyacrylamide composite porous hydrogel of the present application has balanced mechanical properties and porosity.

13 Claims, 6 Drawing Sheets

(51) Int. Cl.
    *C08J 3/24*     (2006.01)
    *C08J 9/00*     (2006.01)

(52) U.S. Cl.
    CPC ........ *C08J 2305/08* (2013.01); *C08J 2333/26* (2013.01)

(56) References Cited

OTHER PUBLICATIONS

Translation of CN 106084257. (Year: 2016).*

* cited by examiner

CHITOSAN-POLYACRYLAMIDE COMPOSITE POROUS HYDROGEL, PREPARATION AND USE THEREOF, AND METAL ION-DETECTING REAGENT AND METHOD

TECHNICAL FIELD

The present application relates to the field of wastewater treatment, in particular to a chitosan-polyacrylamide composite porous hydrogel, preparation and use thereof, and a metal ion-detecting reagent and method.

BACKGROUND

Man-made polluted wastewater contains, but is not limited to, dyes and metal ions commonly used in most industries, posing a serious threat to the safety of global water resources and the health of all humans. In order to alleviate the increasingly severe water resources problem, many water treatment technologies have been developed so far, including adsorption, flocculation, photodegradation, membrane filtration, electrochemical treatment, etc. Wherein, the adsorption method has the advantages of wide applicability, simple operation, low secondary pollution, and relatively low cost.

The technical point of the adsorption method lies in the development of adsorbents. Various adsorbents, such as natural materials, agricultural waste, industrial by-products, biomass and nanomaterials, have been widely used in wastewater purification. Powdered material has high adsorption capacity, but is easy to agglomerate and difficult to separate, which is not conducive to the industrial treatment of polluted wastewater. Hydrogel is a material with extremely strong adsorption capacity composed of a three-dimensional polymer network infiltrated by a large amount of water. Due to its low cost, recyclability, and ease of manufacture, it has been extensively studied in recent years. However, most hydrogels are limited by their poor mechanical properties, low adsorption capacity or slow diffusion kinetics. A large number of attempts have been made to synthesize porous hydrogels by mechanical foam, including freezing method, porogen method, phase separation method, template method and other methods. However, most preparation methods cannot take into account both mechanical properties and porosity.

In view of this, the present application is proposed.

SUMMARY

The first object of the present application is to provide a chitosan-polyacrylamide composite porous hydrogel.

The second object of the present application is to provide a method for preparing a chitosan-polyacrylamide composite porous hydrogel.

The third object of the present application is to provide use of a chitosan-polyacrylamide composite porous hydrogel.

The fourth object of the present application is to provide a metal ion-detecting reagent.

The fifth object of the present application is to provide a metal ion-detecting method.

In order to achieve the objects of the present application, the following technical solutions are used.

The present application provides a chitosan-polyacrylamide composite porous hydrogel, which is prepared by stirring a chitosan sol, an acrylamide, a crosslinking agent and a surfactant into a mixed solution comprising air bubbles, followed by steps of curing, washing, and freeze-drying.

Optionally, the chitosan-polyacrylamide composite porous hydrogel has a porosity of 60-70% and an average pore size of 40-60 μm, and
    the chitosan-polyacrylamide composite porous hydrogel has a compressive strain of 80-93%, a compressive stress of 280-350 kpa, a tensile strain of 5.5-6.4, and a tensile stress of 105-125 kpa.

Optionally, the crosslinking agent is selected from bismethacrylamide, and the surfactant is selected from SDS; and
    preferably, an initiator used for the curing is tetramethylethylenediamine and ammonium persulfate.

Optionally, the concentration of the chitosan sol is 5-15 g/L, preferably 10 g/L;
    the mass ratio of acrylamide to chitosan is 5-10:1, preferably 8:1;
    the mass ratio of the crosslinking agent to acrylamide is 0.02-0.05:4, preferably 0.03:4;
    the mass ratio of the surfactant to acrylamide is 0.005 to 0.02:4, preferably 0.01:4;
    optionally, the volume-to-mass ratio of tetramethylethylenediamine to acrylamide is 0.3 mL:4 g;
    preferably, the volume-to-mass ratio of ammonium persulfate solution to acrylamide is 0.5 mL:4 g, and the weight percentage of the ammonium persulfate solution is 5 wt %.

The present application provides a method for preparing the chitosan-polyacrylamide composite porous hydrogel as described above, comprising at least the following steps:
    S1, preparing a chitosan sol;
    S2, adding an acrylamide, a crosslinking agent and a surfactant to the chitosan sol, mixing and stirring for 5-15 minutes with a stirring rate of 500-600 rpm;
    S3. adding an initiator, then continually stirring for 1.5-3 minutes with a stirring rate is 600-750 rpm; and
    S4. obtaining the chitosan-polyacrylamide composite porous hydrogel after curing, washing, and freeze-drying.

Optionally, the curing is carried out under the condition of drying at 35-45° C. for 3 to 5 hours, preferably drying at 40° C. for 4 hours; and
    preferably, the washing is carried out under the condition of immersing in ultrapure water for 18 to 36 hours, preferably 24 hours.

The present application provides use of the chitosan-polyacrylamide composite porous hydrogel as described above in detection of metal ions;
    preferably, the metal ions comprise gold ions, silver ions, copper ions, aluminum ions, iron ions and lead ions.

The present application provides a metal ion-detecting reagent, which is obtained by adsorbing a color developing agent into the chitosan-polyacrylamide composite porous hydrogel as described above, wherein the color developing agent is a dye that changes color when encountering metal ions;
    preferably, the volume ratio of the chitosan-polyacrylamide composite porous hydrogel to the color developing agent is 6:4-6, preferably 6:5; the concentration of the color developing agent is 10-100 mg/L;
    more preferably, the color developing agent is selected from xylenol orange; and
    furthermore preferably, the thickness of the chitosan-polyacrylamide composite porous hydrogel is 0.1-0.8 cm, preferably 0.3-0.6 cm.

The present application provides a method for detecting metal ions using the metal ion-detecting reagent as described above, comprising at least the following steps:

S1, dropping a test solution onto a surface of the metal ion-detecting reagent, wherein the volume ratio of the metal ion-detecting reagent to the test solution is 5-15:1, preferably 9:1;

S2, reacting for 10-30 minutes at 15-25° C., and reading the absorbance of the hydrogel with a microplate reader; and S3, comparing the ratio between the absorbance value at absorption peak of the color developing agent and the absorbance value at absorption peak of the metal ions, and analyzing the data.

The present application has at least the following beneficial effects.

The present application uses a chitosan as an adsorbent and a polyacrylamide hydrogel as a resilient matrix to prepare a porous composite hydrogel having good mechanical properties by incorporating the adsorbent and interconnected pores into the gel matrix. The resilient hydrogel matrix provides overall mechanical strength, the adsorbent provides active adsorption sites for attaching pollutants, and the interconnected pores facilitate the migration of solvents in the hydrogel. Hence, fast adsorption kinetics is achieved while taking into account mechanical properties and porosity.

In the preparation of the present application, air bubbles are introduced into the hydrogel precursor through a stirring and foaming process, and a surfactant is added to stabilize the air bubbles, thereby obtaining a porous composite material with balanced mechanical properties and porosity.

The present application applies the hydrogel that has adsorbed dye pollutants to a semi-quantitative detection of metal ions, and realizes the secondary utilization of the adsorbed dye pollutants, which is of great significance to the protection of the environment.

DETAILED DESCRIPTION

Figure 1:
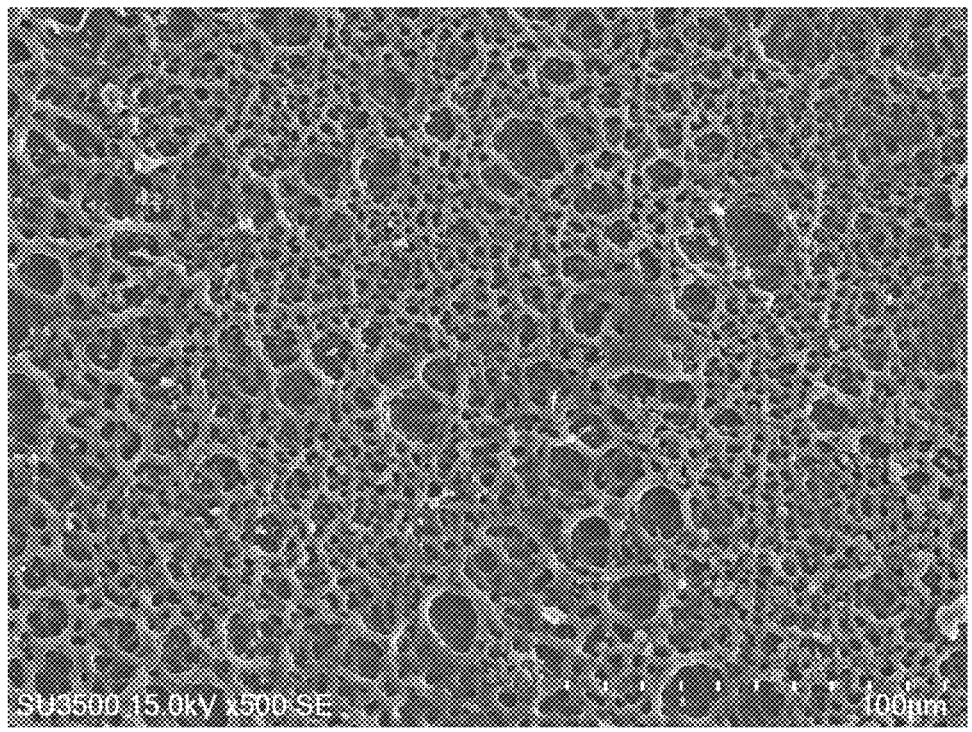
FIG. 1 is SEM graph of the chitosan-polyacrylamide porous hydrogel.

It should be pointed out that the following detailed descriptions are all illustrative and are intended to provide further explanations for the present application. Unless otherwise defined, all of the technical and scientific terms used herein have the same meaning as commonly understood by one of ordinary skill in the art in the field to which the present application belongs.

It should be noted that the terms used herein are only for describing specific embodiments, and are not intended to limit the exemplary embodiments of the present application. As used herein, a singular form includes a plural form unless the context clearly dictates otherwise. In addition, it should also be understood that when the terms "comprising" and/or "including" are used in the description, they indicate that there are features, steps, operations, devices, components, and/or combinations thereof.

The technical solutions of the present application will be clearly and completely described below in conjunction with embodiments. Obviously, the described embodiments are a part, rather than all of the embodiments of the present application. Based on the embodiments of the present application, all other embodiments obtained by those of ordinary skill in the art without creative work shall fall within the protection scope of the present application.

The first aspect of the embodiments of the present application provides a chitosan-polyacrylamide composite porous hydrogel. Its morphology is that the pure polyacrylamide hydrogel presents a cross-linked network structure, while the porous chitosan-polyacrylamide porous hydrogel presents a cross-linked network structure and has pores ranging from tens to hundreds of microns, as found by observing the hydrogels with SEM.

The chitosan-polyacrylamide composite porous hydrogel of the embodiments of the present application is prepared by in situ polymerization of a chitosan sol, an acrylamide, a crosslinking agent and a surfactant into a mixed solution comprising liquid droplets, followed by steps of curing, washing, and freeze-drying.

The chitosan-polyacrylamide composite porous hydrogel has a porosity of 60-70% and an average pore size of 40-60 μm.

The embodiments of the present application use a chitosan as an adsorbent and a polyacrylamide hydrogel as a resilient matrix to prepare a porous composite hydrogel having good mechanical properties by incorporating the adsorbent and interconnected pores into the hard hydrogel matrix. The resilient hydrogel matrix provides overall mechanical strength, the adsorbent provides active adsorption sites for attaching pollutants, and the interconnected pores facilitate the migration of solvents in the hydrogel. Hence, fast adsorption kinetics can be achieved while taking into account mechanical properties and porosity. The chitosan-polyacrylamide porous hydrogel of the embodiments of the present application has a covalently cross-linked neutral and chemically inert PAAM network, exhibits a satisfactory adsorption capacity at various pHs, and shows great potential for wastewater treatment under strong acid conditions. It is surprisingly found in experiments of the present application that the mechanical strength of the porous hydrogel prepared by using both chitosan and polyacrylamide is significantly higher than that of the hydrogel prepared by using polyacrylamide alone. That is, the adsorption performance of the composite hydrogel of the present application is increased without compromising the mechanical properties of the matrix material, but further increasing its mechanical properties.

As an improvement of the embodiments of the present application, the crosslinking agent can be selected from bismethacrylamide. The surfactant can be selected from sodium dodecyl sulfate (SDS), and the surfactant SDS is introduced to reduce the surface tension of the gas-liquid interface, thereby stabilizing the air bubbles. The initiators used for curing is tetramethylethylenediamine and ammonium persulfate.

As an improvement of the embodiments of the present application, the concentration of the chitosan sol is 5-15 g/L, preferably 10 g/L. If the concentration is too high, the chitosan is not easy to dissolve and the cost increases. If the concentration is too low, the prepared composite hydrogel will not have sufficient adsorption capacity for pollutants. The chitosan sol contains 2% glacial acetic acid by volume.

As an improvement of the embodiments of the present application, the mass ratio of acrylamide to chitosan is 5-10:1, preferably 8:1. The chitosan is used as an adsorbent. Therefore, if the amount of the chitosan added is too small, the adsorption of pollutants will be insufficient. If the amount of chitosan added is too large, the removal rate will slightly increase with the increase of the chitosan added, but the increment is small. At the same time, if the amount of acrylamide added is too large, the crosslinking density will be too high, and the brittleness of the composite hydrogel will increase. If the amount of acrylamide added is too small, the density of crosslinking points per unit volume will be too low, greatly reducing crosslinking efficient.

As an improvement of the embodiments of the present application, the mass ratio of the crosslinking agent to acrylamide is 0.02-0.05:4, preferably 0.03:4. If the crosslinking agent is added too much, the crosslinking speed will increase and the crosslinking point will be quickly saturated, so the brittleness of the composite hydrogel will increase. If the crosslinking agent is added too little, the crosslinking speed will slow down and the production efficiency will decrease.

As an improvement of the embodiments of the present application, the mass ratio of the surfactant to acrylamide is 0.005 to 0.02:4, preferably 0.01:4. The main function of the surfactant is to stabilize the air bubbles. If the surfactant is added too little, the stabilizing effect will not be good. If the surfactant is added too much, it will be difficult to dissolve and increase the cost.

As an improvement of the embodiments of the present application, the volume-to-mass ratio of tetramethylethylenediamine to acrylamide is 0.3 mL:4 g, more preferably, the volume-to-mass ratio of ammonium persulfate solution to acrylamide is 0.5 mL:4 g, and the weight percentage of the ammonium persulfate solution is 5 wt %. If the initiator is added too little, the curing speed will be too slow, compromising the preparation efficiency. If the crosslinking agent is added too much, the curing speed will be too fast, resulting in larger pores and increased brittleness of the hydrogel. The resulting hydrogel will be fragile and too late for steps like packaging, which is not conducive to the preparation.

The second aspect of the embodiments of the present application provides a method for preparing the chitosan-polyacrylamide composite porous hydrogel, comprising at least the following steps:

S1, preparing a chitosan sol;

S2, adding an acrylamide, a crosslinking agent and a surfactant to the chitosan sol, mixing and stirring for 5-15 minutes with a stirring rate of 500-600 rpm, preferably 600 rpm;

S3. adding an initiator, then continually stirring for 1.5-3 minutes with a stirring rate is 600-750 rpm; wherein if the stirring rate is too slow, the hydrogel will be uneven, and part of the hydrogel will be pale yellow, turbid and brittle; and due to the high viscosity of the solution, higher stirring rate is difficult to achieve; and S4. obtaining the chitosan-polyacrylamide composite porous hydrogel after curing, washing, and freeze-drying.

The condition of the curing is drying at 35-45° C. for 3 to 5 hours, preferably drying at 40° C. for 4 hours. If the curing temperature is too low, the setting time of the hydrogel will be too long and the air bubbles will escape. If the temperature is too high, the color of the hydrogel will change.

Preferably, the washing is carried out under the condition of immersing in ultrapure water for 18 to 36 hours, preferably 24 hours.

In the preparation of the embodiments of the present application, air bubbles are introduced into the hydrogel precursor through a stirring and foaming process, and a surfactant is added to stabilize the air bubbles, thereby obtaining a porous material with both mechanical properties and porosity.

The third aspect of the embodiments of the present application provides use of the chitosan-polyacrylamide composite porous hydrogel in adsorption and detection of metal ions. Metals include heavy metals and light metals. Heavy metals refer to metals with a density greater than 4.5, including gold, silver, copper, iron, lead and the like. Heavy metal pollution is different from other organic compound pollution. Many organic compounds can be purified by physical, chemical, and biological means in nature to reduce or eliminate the harm. Heavy metals tend to be enriched and are difficult to degrade in the environment spontaneously. Heavy metals can react strongly with proteins and various enzymes in the human body, and may also be enriched in many organs in the human body, causing great harm to the human body. Excessive iron will damage the basic components of cells and cause other harms such as imbalance of other trace elements. Light metals are metals with a relative density of less than 5. Excessive accumulation of a light metal aluminum in the body can cause harms such as mental retardation for children, memory loss for middle-aged people and dementia for the elderly. At present, the commonly used metal ion detection methods include complexometric titration, electrochemical analysis, atomic spectroscopy and so on. Most of the existing methods have the shortcomings such as requiring precision instruments, complex operations, and high cost. Therefore, it is extremely important to develop an on-site, rapid, and visual detection method for metal ions.

In this regard, the fourth aspect of the embodiments of the present application provides a metal ion-detecting reagent, which is obtained by adsorbing a color developing agent into the chitosan-polyacrylamide composite porous hydrogel as described above, wherein the color developing agent is a dye that changes color when encountering metal ions; preferably, the condition of the adsorption is 24 hours at room temperature, and the concentration of the color developing agent is 10-100 mg/L.

Further preferably, the volume ratio of the chitosan-polyacrylamide composite porous hydrogel to the color developing agent is 6:4-6, preferably 6:5. The color developing agent is selected from xylenol orange, which can change from yellow to blue-violet upon combing with metal ions. The dye-absorbed chitosan-polyacrylamide composite porous hydrogel not only possesses the resilient mechanical properties of the hydrogel, but also obtains the characteristic of the dye that changes color when encountering metal ions. Therefore, the dye-absorbed chitosan-polyacrylamide composite porous hydrogel can be applied to the detection of metal ions to realize rapid and visual detection of heavy metals.

Furthermore preferably, the thickness of the chitosan-polyacrylamide composite porous hydrogel is 0.1-0.8 cm, preferably 0.3-0.6 cm. The area of the chitosan-polyacrylamide composite porous hydrogel is 0.2-0.5 cm². If it is transferred to a 96-well plate during the preparation process, the prepared chitosan-polyacrylamide composite porous hydrogel has a bottom area of 0.32 cm² and a height of 0.5625 cm.

The fifth aspect of the embodiments of the present application provides a method for detecting metal ions using the metal ion-detecting reagent as described above, comprising at least the following steps:

S1, dropping a test solution onto a surface of the metal ion-detecting reagent, wherein the volume ratio of the metal ion-detecting reagent to the test solution is 5-15:1, preferably 9:1;

S2, reacting for 10-30 minutes at 15-25° C., and reading the absorbance of the hydrogel with a microplate reader; and S3, comparing the ratio between the absorbance value at absorption peak of the color developing agent and the absorbance value at absorption peak of the metal ions, and analyzing the data.

Among them, the UV absorption peak of xylenol orange under acidic conditions is 430 nm, the UV absorption peak of iron ions is 570 nm, and the UV absorption peak of aluminum ions is 550 nm.

The embodiments of the present application apply the hydrogel that has adsorbed dye pollutants to a semi-quantitative detection of metal ions iron and aluminum, and realizes the secondary utilization of the adsorbed dye pollutants, which is of great significance to the protection of the environment.

The following is a further description of embodiments of the present application through specific implementations. The materials used in the specific implementations are as follows: acrylamide (AAm, 99.0%), N,N'-methylenebisacrylamide (MBAA, 99%), sodium dodecyl sulfate (SDS, 92.5%-100.5%), and tetramethylethylenediamine (TEMED, 99%) that were purchased from Aladdin Industrial Co., Ltd. (Shanghai, China), and chitosan (CS), ammonium persulfate (APS, 99%), glacial acetic acid, sodium acetate, and xylenol orange (XO) that were purchased from Macklin Industrial Co., Ltd. (Shanghai, China). All chemicals are analytical reagent grade, no further purification is required. All experiments use deionized water.

EXAMPLE 1

Preparation of Chitosan-Polyacrylamide Porous Hydrogel

1. Mixing 0.5 g chitosan, 1 mL glacial acetic acid and 50 mL deionized water in a 250 mL beaker, and stirring at 60° C. and 500 rpm for 30 minutes to form a uniform and transparent chitosan sol.

2. Mixing 4 g acrylamide, 0.03 g bismethacrylamide and 0.1 g SDS and stirring for 10 minutes.

3. Adding SDS and stirring at 600 rpm to produce a large amount of air bubbles, the volume of the slurry expanded obviously.

4. Adding 0.3 mL tetramethylethylenediamine and 5 mL ammonium persulfate solution (5 wt %), and stirring the mixture for 2 minutes with a stirring rate maintaining at 750 rpm.

5. Transferring the solution to a 96-well plate, sealing with a plastic wrap, and storing in an oven at 40° C. for 4 hours to fully cure.

6. Immersing the fully cured hydrogel in ultrapure water for 24 hours to remove uncrosslinked acrylamide and chitosan monomers and SDS.

7. Placing the hydrogel into a freeze dryer for freeze drying to obtain a chitosan-polyacrylamide porous hydrogel. The obtained cylindrical chitosan-polyacrylamide composite porous hydrogel has a bottom area of 0.32 cm² and a height of 0.5625 cm.

For comparison, a pure polyacrylamide (PAAM) hydrogel was also synthesized by the following steps:

1. dissolving 4 g acrylamide into 50 mL deionized water in a 250 mL beaker to form a uniform solution;
2. adding 0.03 g bismethacrylamide to the solution and stirring to form uniform and transparent solution;
3. adding 5 mL ammonium persulfate solution (5 wt %) and 0.3 mL tetramethylethylenediamine, and stirring the mixture for 2 minutes with a stirring rate maintaining at 750 rpm;
4. transferring the solution to a 96-well plate, sealing with a plastic wrap, and storing in an oven at 40° C. for 4 hours to fully cure.
5. immersing the fully cured hydrogel in ultrapure water for 24 hours to remove uncrosslinked acrylamide monomers;
6. placing the hydrogel into a freeze dryer for freeze drying to obtain a chitosan-polyacrylamide porous hydrogel.

The chitosan-polyacrylamide porous hydrogel and the pure polyacrylamide (PAAM) hydrogel were characterized.

1. Structure Characterization

Figure 2:
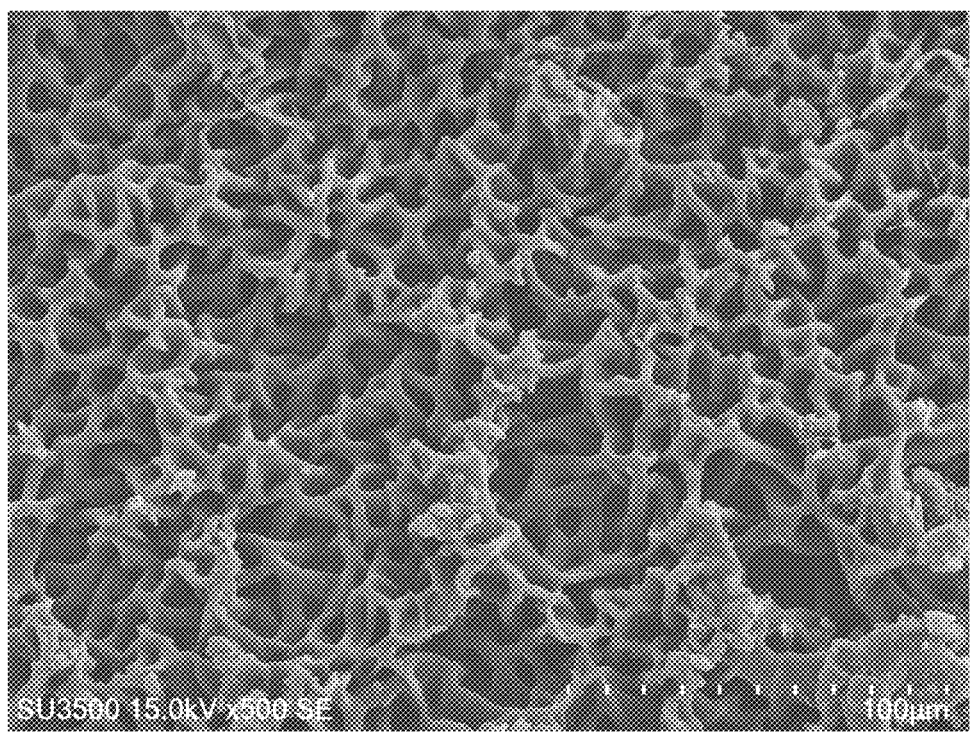
FIG. 2 is SEM graph of pure polyacrylamide hydrogel.

The hydrogels were characterized by SEM, and the SEM graphs obtained are shown in FIG. 1 and FIG. 2, and FIG. 1 is SEM graph of the chitosan-polyacrylamide porous hydrogel and FIG. 2 is SEM graph of the pure polyacrylamide hydrogel. As shown in FIG. 1 and FIG. 2, the pure polyacrylamide hydrogel presents a cross-linked network structure, while the porous chitosan-polyacrylamide porous hydrogel presents a cross-linked network structure and has pores ranging from tens to hundreds of microns.

2. Batch Adsorption Experiment

The traditional bottle-point method was used to carry out a batch adsorption experiment, and the adsorption performance of porous chitosan-polyacrylamide porous hydrogel was studied. All experiments were performed in 20 mL glass vials. Each glass vial contained 20 mL of dye solution and 0.02 g of dry hydrogel. During the adsorption process, the sample was stored at room temperature. The initial concentration and final concentration of the solution were analyzed with ultraviolet spectrophotometer. All experiments were carried out three times, and additional experiments were carried out when the deviation was greater than 5%. The following formula was used to calculate the dye absorption per gram of adsorbent: $Q_e=(C_0-C_e) \times V/m$ Adsorption efficiency formula: $E\%=(C_0-C_e)/C_0 \times 100\%$, wherein $C_0$ and $C_e$ (mg/L) are the initial and measured dye concentration, V (mL) is the volume of the solution, and m is the weight of the dry adsorbent.

The adsorption efficiency of the chitosan-polyacrylamide porous hydrogel in Example 1 was 81.8%.

3. Kinetics Study

Figure 3:
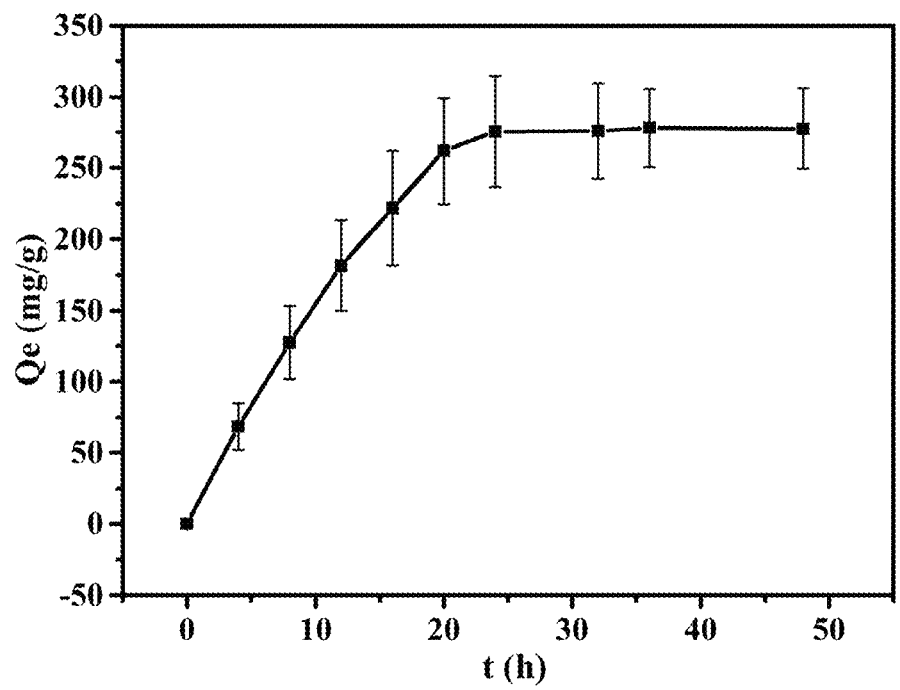
FIG. 3 is adsorption kinetic curve of pure polyacrylamide hydrogel.
Figure 4:
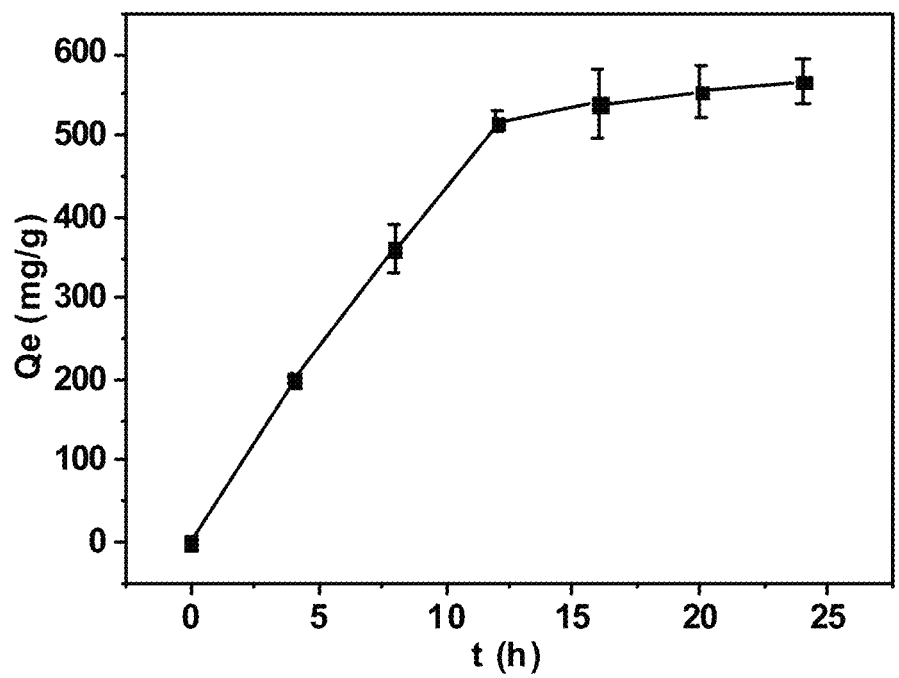
FIG. 4 is adsorption kinetic curve of the chitosan-polyacrylamide porous hydrogel.

The adsorption kinetics experiment of XO started at an initial concentration of 100 mg/L, and then maintained at room temperature. The same vial was sampled at predetermined time intervals to measure the remaining concentration of XO. The experimental results are shown in FIG. 3 and FIG. 4. FIG. 3 is the adsorption kinetic curve of the pure polyacrylamide hydrogel. FIG. 4 is the adsorption kinetic curve of the chitosan-polyacrylamide porous hydrogel.

As shown in FIG. 3 and FIG. 4, the equilibrium time of the chitosan-polyacrylamide porous hydrogel (~12 hours) is much shorter than that of the pure polyacrylamide hydrogel (~24 hours). And the adsorption capacity of xylenol orange of the chitosan-polyacrylamide porous hydrogel (513 mg/g) is much higher than that of the pure polyacrylamide hydrogel (277 mg/g).

4. Mechanical Properties

The method for testing the maximum compressive strain and compressive stress was that: in a compression experiment, a cylindrical sample with a diameter of 20 mm and a height of 10 mm was placed in a mechanical testing machine (Instrument, Japan-Shimadzu-EZ LX), and compressed at a loading speed of 5 mm/s and a load of 100 N.

The tensile measurement method was that: in a tensile test, a sample was cut into a cuboid shape (length 35 mm, width 20 mm, and thickness 5 mm). Both ends of the sample were clamped, loaded on a mechanical testing machine (Instrument, Japan-Shimadzu-EZ LX), and stretched at a loading speed of 5 mm/s and a load of 100 N.

The experimental results are shown in Table 1.

TABLE 1

|  | Maximum compressive strain | Maximum compressive stress | Maximum tensile strain | Maximum tensile stress |
|---|---|---|---|---|
| Chitosan-polyacrylamide porous hydrogel | 90% | 312 kpa | 5.7 | 117 kap |
| Pure polyacrylamide hydrogel | 70% | 61 kpa | 3.4 | 24 kpa |

EXAMPLE 2

Screening of Preparation Method of Chitosan-Polyacrylamide Porous Hydrogel

Screening experiment 1: the preparation followed the method of Example 1 with the only exception that the rotation speed after adding tetramethylethylenediamine was different. The specific conditions and results are shown in Table 2:

TABLE 2

| | Rotation speed (r/min) | | | |
|---|---|---|---|---|
| | Stiring at 500 rpm for 2 min | Stiring at 600 rpm for 2 min | Stiring at 750 rpm for 2 min | Stiring at 800 rpm |
| Result | The hydrogel was not uniform, and part of the hydrogel was pale yellow, turbid and brittle | The nonuniformity was reduced after increasing the rotation speed | Uniform and transparent hydrogel was obtained | Not available due to the high viscosity of the solution |

Screening experiment 2: the preparation followed the method of Example 1 with the only exception that the amount of CS added was different. The specific conditions and results are shown in Table 3:

TABLE 3

| CS (g) | 0.1 | 0.2 | 0.3 | 0.4 | 0.5 | 0.6 | 0.7 | 0.8 |
|---|---|---|---|---|---|---|---|---|
| Adsorption efficiency (%) | 40.11 | 59.26 | 59.83 | 75.25 | 81.8 | 82.44 | 83.78 | 84.44 |

As can be seen from Table 3, when the amount of chitosan added was above 0.5 g, although the removal rate increased slightly with the increase of the chitosan added, the increment was relatively small. Hence, the addition amount was chosen to be 0.5 g.

Screening experiment 3: the preparation followed the method of Example 1 with the only exception that the amount of tetramethylethylenediamine and ammonium persulfate added was different. The specific conditions and results are shown in Table 4:

TABLE 4

| Ammonium persulfate (g) | 0.08 | 0.16 | 0.2 | 0.25 | 0.25 | 0.25 |
|---|---|---|---|---|---|---|
| Tetramethylethylenediamine (μl) | 150 | 150 | 150 | 150 | 300 | 400 |
| Result | Not fully cured at 4 h | Not fully cured at 4 h | Not fully cured at 4 h | Not fully cured at 4 h | Fully cured at 4 h | Cured to fast to be packaged |

As can be seen from Table 4, when choosing 0.25 g ammonium persulfate and 300 μL tetramethylethylenediamine, the curing time is more suitable.

Screening experiment 4: the preparation followed the method of Example 1 with the only exception that the curing temperature was different. The specific conditions and results are shown in Table 5:

TABLE 5

| | Temperature | | | | |
|---|---|---|---|---|---|
| | Room Temperature | 30° C. | 40° C. | 50° C. | 60° C. |
| Result | Not fully cured at 12 h | Not fully cured at 6 h | Fully cured at 4 h | Fully cured at 4 h, the color of the hydrogel changed slightly | Fully cured at 4 h, but the color of the hydrogel changed to yellow |

When the temperature was too low, the setting time of the hydrogel was too long, and the air bubbles escaped. When the temperature was too high, the hydrogel changed color. Hence, the temperature was chosen to be 40° C.

EXAMPLE 3

Figure 5:
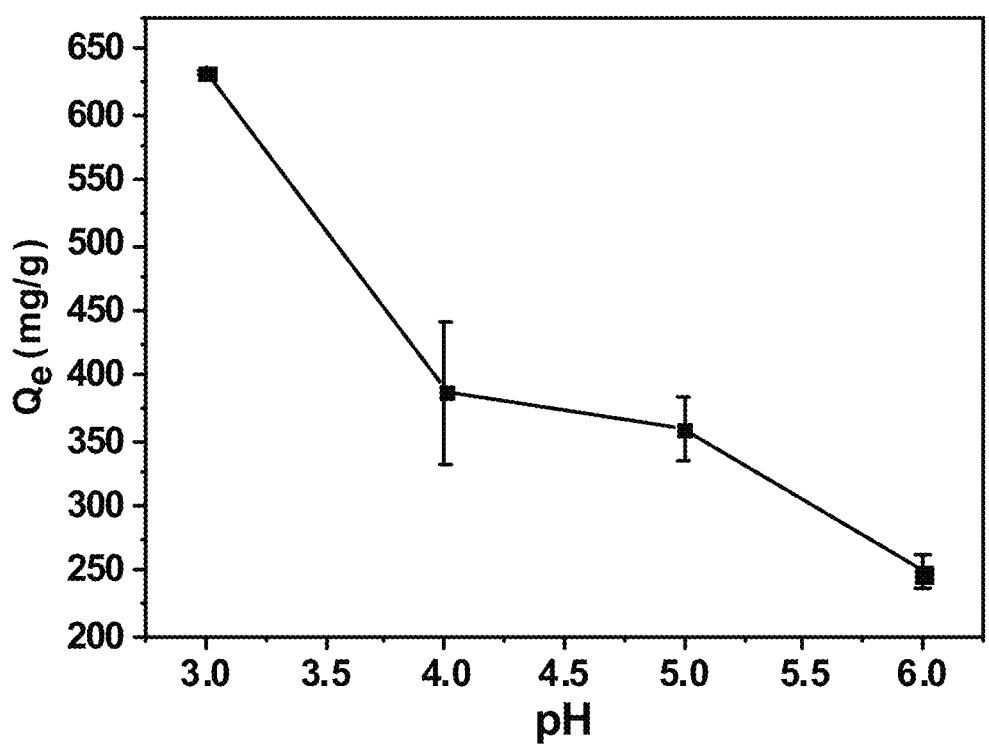
FIG. 5 is adsorption capacity of the chitosan-polyacrylamide porous hydrogel for xylenol orange at different pH values.
Figure 6:
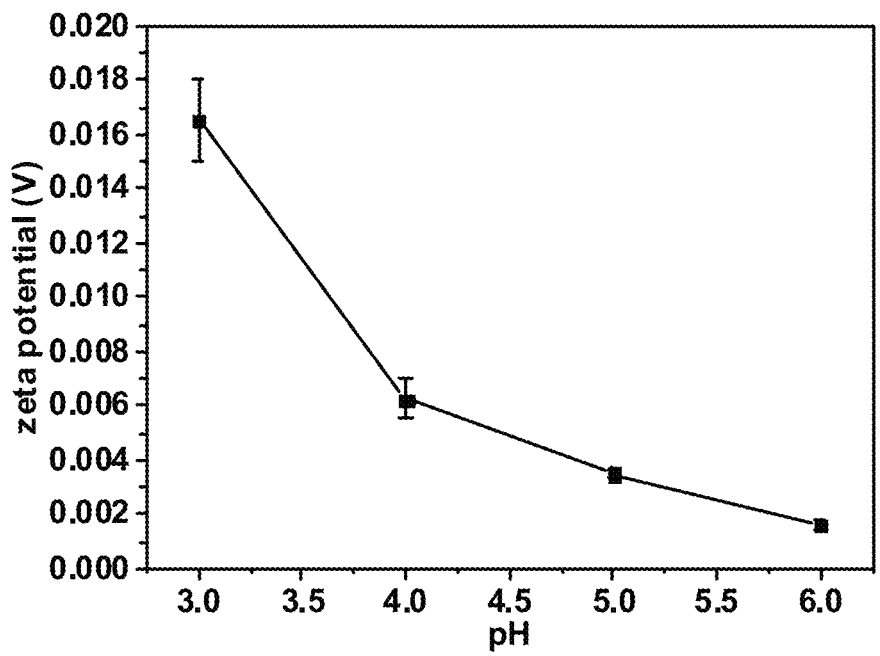
FIG. 6 is zeta potential of the chitosan-polyacrylamide porous hydrogel at different pH values.

The effect of pH on adsorption was studied in the range of pH 3-6. In each test, 0.02 g of the chitosan-polyacrylamide porous hydrogel prepared in Example 1 was placed in 20 mL of XO solution (300 mg L$^{-1}$) with a specified pH value, and the final XO concentration of the solution was analyzed after the adsorption reached equilibrium (24 hours). The experimental results are shown in FIG. 5 and FIG. 6.

The pH value of wastewater varies greatly and often has a significant impact on the adsorption process. As shown in FIG. 5, the adsorption capacity of the porous chitosan-polyacrylamide porous hydrogel in the equilibrium state decreased monotonously as the pH increased from 3 to 6, and the maximum value was 559.05 mg/g. This dependence is reasonable because the backbone of the XO molecule is negatively charged, while the surface of the porous chitosan-polyacrylamide porous hydrogel is positively charged. The zeta potential test is shown in FIG. 6. When the pH of the solution increased from 3 to 6, the zeta potential of the porous chitosan-polyacrylamide porous hydrogel decreased from 16.5 mV to 1.57 mV, indicating that the positive charge was dominant on the surface of the porous chitosan-polyacrylamide porous hydrogel. In sum, the porous chitosan-polyacrylamide porous hydrogel has a covalently cross-linked neutral and chemically inert PAAM network which is suitable for wastewater treatment under strong acid conditions

EXAMPLE 4

Detection of Iron/Aluminum Ions

1. Preparation of the Metal Ion-Detecting Reagent: the chitosan-polyacrylamide composite porous hydrogel prepared in Example 1 was used to adsorb xylenol orange, and the adsorption conditions were 24 hours at room temperature, the concentration of xylenol orange was 50 mg/L, and the volume was 150 μL;

2. Detection of Metal Ions:
2.1. preparing iron/aluminum standard solutions having different concentrations, respectively;
2.2. dropping the iron/aluminum standard solutions having different concentrations onto a surface of the metal ion-detecting reagent, respectively, the volume of the iron/aluminum standard solutions was 20 μL;
2.2. maintaining at room temperature for 20 minutes, and reading the absorbance of the hydrogel with a microplate reader; and
2.3. comparing the ratio between the absorbance value at 430 nm of the hydrogel and the absorbance value at 550 nm (aluminum) or 570 nm (iron) of the metal ions using a colorimetric assay, respectively, and further analyzing the data.

Figure 7:
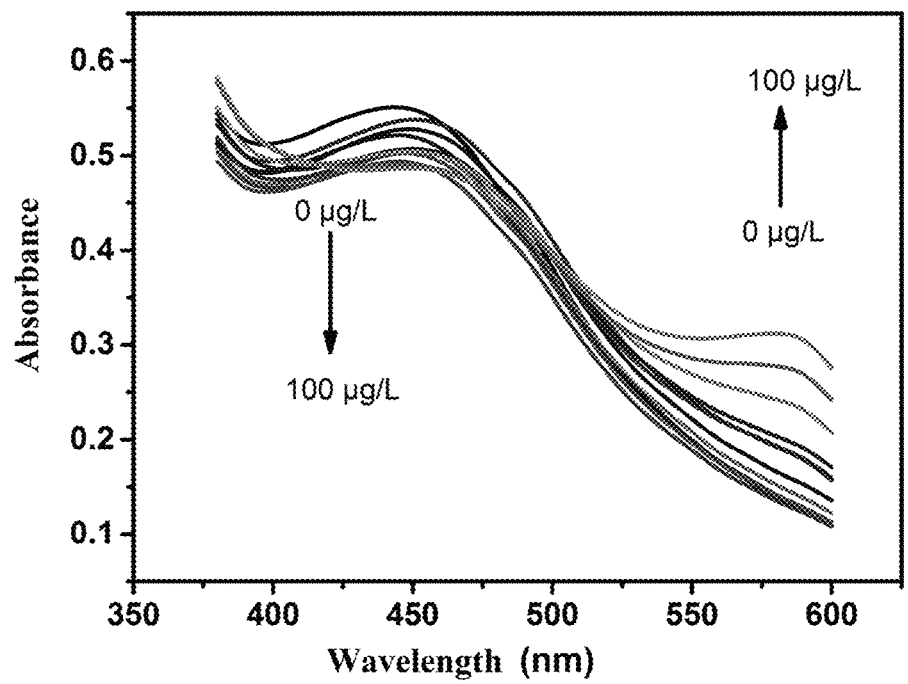
FIG. 7 is UV-Vis Spectra of $Fe^{3+}$ while detecting with the metal ion-detecting reagent.
Figure 8:
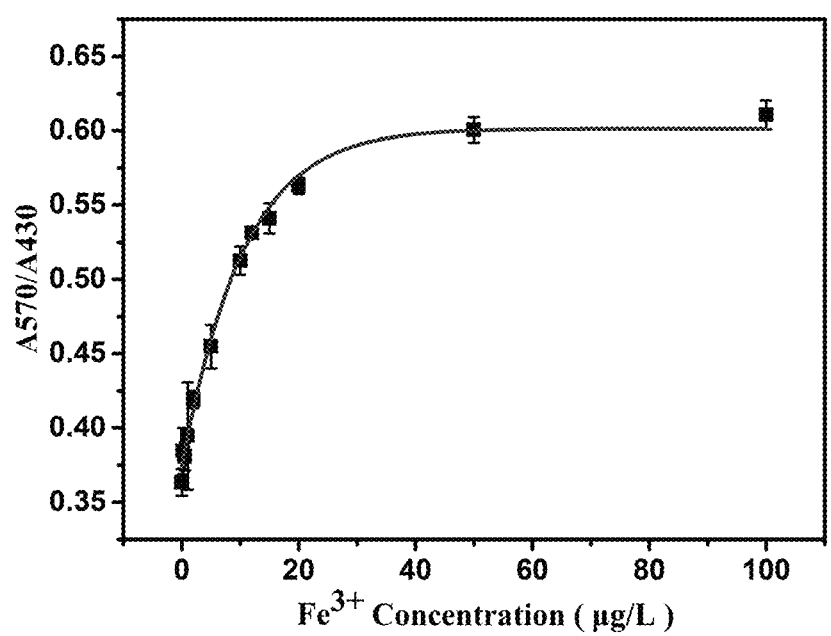
FIG. 8 is concentration of $Fe^{3+}$ versus the varying ratios of absorbances of the hydrogel while detecting with the metal ion-detecting reagent.

Experimental Results:

(1) The experimental results of Fe$^{3+}$ detection are shown in FIG. 7 and FIG. 8:

FIG. 8 is the concentration of Fe$^{3+}$ versus the varying ratios (A570/A430) of absorbances of the solution. The data in FIG. 8 shows that as the concentration of Fe$^{3+}$ continues to increase, the ratio continues to increase, and when the concentration of Fe$^{3+}$ is between 0-10 μg/L, the ratio of the absorbance value at 430 nm to the absorbance at 570 nm has a linear relationship with the concentration of Fe$^{3+}$.

Figure 9:
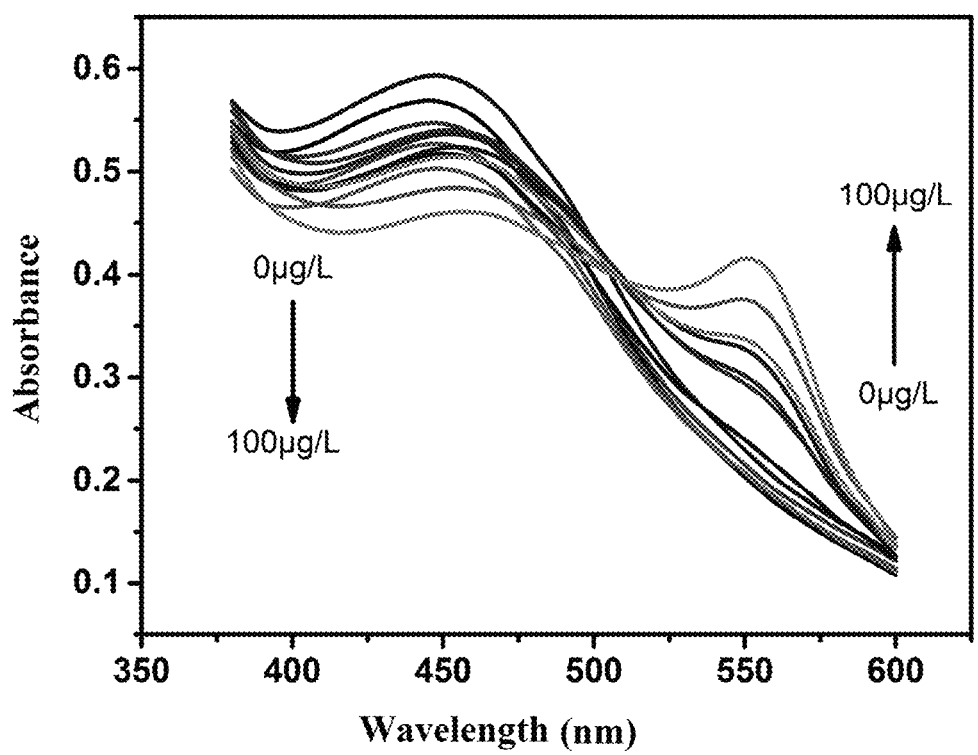
FIG. 9 is UV-Vis Spectra of $Al^{3+}$ while detecting with the metal ion-detecting reagent.
Figure 10:
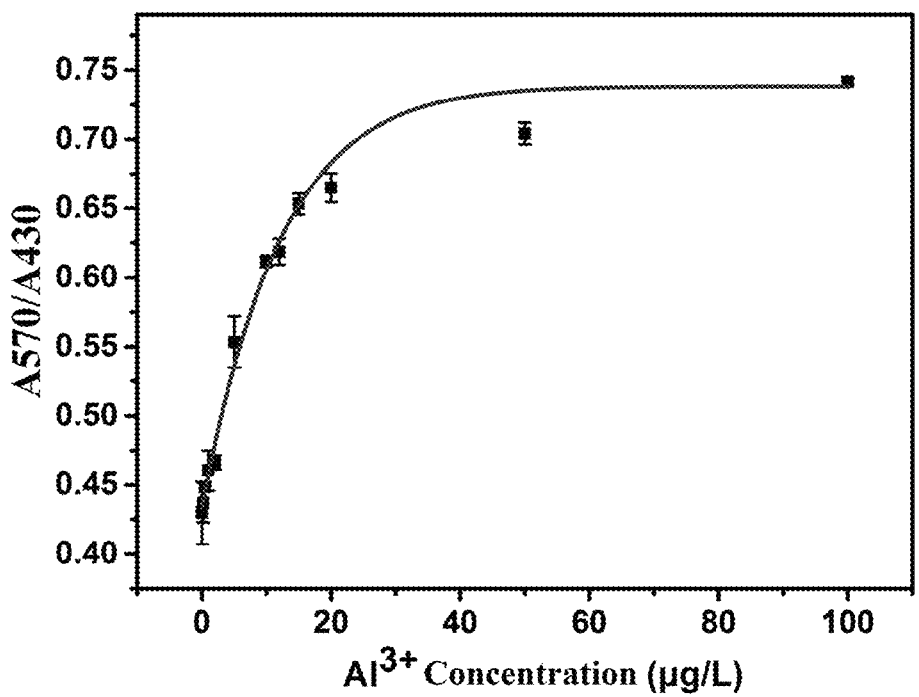
FIG. 10 is a concentration of $Al^{3+}$ versus the varying ratios of absorbances of the hydrogel while detecting with the metal ion-detecting reagent.

(2) The experimental results of Al$^{3+}$ detection are shown in FIG. 9 and FIG. 10:

FIG. 10 is the concentration of Al$^{3+}$ versus the varying ratios (A570/A430) of absorbances of the solution. The data in FIG. 10 shows that as the concentration of Al$^{3+}$ continues to increase, the ratio continues to increase, and when the concentration of Al$^{3+}$ is between 0-12 μg/L, the ratio of the absorbance value at 430 nm to the absorbance at 570 nm has a linear relationship with the concentration of Al$^{3+}$.

Although the preferable embodiments of the present application are disclosed above, they are not used to limit the claims. Any skilled in the art can make several possible changes and modifications without departing from the concept of the present application. The protection scope of the present application shall be subject to the scope defined by the claims of the present application.

What is claimed is:

1. A chitosan-polyacrylamide composite porous hydrogel, which is prepared by in situ polymerization of a chitosan sol, an acrylamide, a crosslinking agent and a surfactant into a mixed solution comprising liquid droplets, followed by steps of curing, washing, and freeze-drying;
   wherein the chitosan-polyacrylamide composite porous hydrogel has a porosity of 60-70% and an average pore size of 40-60 μm.

2. The chitosan-polyacrylamide composite porous hydrogel of claim 1, wherein the chitosan-polyacrylamide composite porous hydrogel has a compressive strain of 80-93%, a compressive stress of 280-350 kpa, a tensile strain of 5.5-6.4, and a tensile stress of 105-125 kpa.

3. The chitosan-polyacrylamide composite porous hydrogel of claim 1, wherein the crosslinking agent is N, N'-methylenebisacrylamide, and the surfactant is sodium dodecyl sulfate.

4. The chitosan-polyacrylamide composite porous hydrogel of claim 1, wherein
   the concentration of the chitosan sol is 5-15 g/L;
   the mass ratio of acrylamide to chitosan is 5-10:1;
   the mass ratio of the crosslinking agent to acrylamide is 0.02-0.05:4; and
   the mass ratio of the surfactant to acrylamide is 0.005 to 0.02:4.

5. A method for preparing the chitosan-polyacrylamide composite porous hydrogel of claim 1, comprising at least the following steps:
S1, preparing a chitosan sol;
S2, adding an acrylamide, a crosslinking agent and a surfactant to the chitosan sol, mixing and stirring for 5-15 minutes with a stirring rate of 500-600 rpm;
S3. adding an initiator, then continually stirring for 1.5-3 minutes with a stirring rate is 600-750 rpm; and
S4. obtaining the chitosan-polyacrylamide composite porous hydrogel after curing, washing, and freeze-drying.

6. The method of claim 5, wherein the curing is carried out under the condition of heat preservation at 35-45° C. for 3 to 5 hours.

7. The chitosan-polyacrylamide composite porous hydrogel of claim 3, wherein an initiator used for the curing is tetramethylethylenediamine and ammonium persulfate.

8. The chitosan-polyacrylamide composite porous hydrogel of claim 4, wherein
the concentration of the chitosan sol is 10 g/L;
the mass ratio of acrylamide to chitosan is 8:1;
the mass ratio of the crosslinking agent to acrylamide is 0.03:4; and
the mass ratio of the surfactant to acrylamide is 0.01:4.

9. The chitosan-polyacrylamide composite porous hydrogel of claim 7, wherein, the volume-to-mass ratio of ammonium persulfate solution to acrylamide is 0.5 mL:4 g, and the weight percentage of the ammonium persulfate in the ammonium persulfate solution is 5 wt %.

10. The method of claim 6, wherein the washing is carried out under the condition of ultrafiltration in ultrapure water for 18 to 36 hours.

11. The method of claim 6, wherein the curing is carried out under the condition of heat preservation at 40° C. for 4 hours.

12. The method of claim 10, wherein the washing is carried out under the condition of ultrafiltration in ultrapure water for 24 hours.

13. The chitosan-polyacrylamide composite porous hydrogel of claim 7, wherein the volume-to-mass ratio of tetramethylethylenediamine to acrylamide is 0.3 mL:4 g.

* * * * *